United States Patent [19]
Foster

[11] Patent Number: 5,303,816
[45] Date of Patent: Apr. 19, 1994

[54] SEAL STRIP FOR RECIPROCATING FLOOR CONVEYORS

[76] Inventor: Raymond K. Foster, P.O. Box 1, Madras, Oreg. 97741

[21] Appl. No.: 103,415

[22] Filed: Aug. 6, 1993

[51] Int. Cl.$^5$ .............................................. B65G 25/00
[52] U.S. Cl. .................................... 198/750; 414/525.1
[58] Field of Search ................... 198/750; 414/525.1, 414/525.9

[56] References Cited

U.S. PATENT DOCUMENTS

| | | | |
|---|---|---|---|
| 4,492,303 | 1/1985 | Foster | 198/750 |
| 4,679,686 | 7/1987 | Foster | 198/750 |
| 4,896,761 | 1/1990 | Foster | 198/750 |
| 4,940,132 | 7/1990 | Foster | 198/750 |
| 4,984,679 | 1/1991 | Foster | 198/750 |
| 5,064,052 | 11/1991 | Foster | 198/750 |
| 5,222,592 | 6/1993 | Quaeck | 198/750 |

Primary Examiner—D. Glenn Dayoan
Attorney, Agent, or Firm—David P. Campbell; Delbert J. Barnard

[57] ABSTRACT

An elastomeric seal (10) including a split, V-shaped upper edge (16) including first and second branches (24, 26) that angle away from each other and toward opposed sides of adjacent floor members (32) of a reciprocating floor conveyor. The elastomeric seal includes a rounded base portion (14) including a channel (18) therein defining two side rims (20, 21) that are deflectable toward each other. The central portion (12) of the seal (10) is tapered from the V-shaped edge to the base portion.

4 Claims, 2 Drawing Sheets

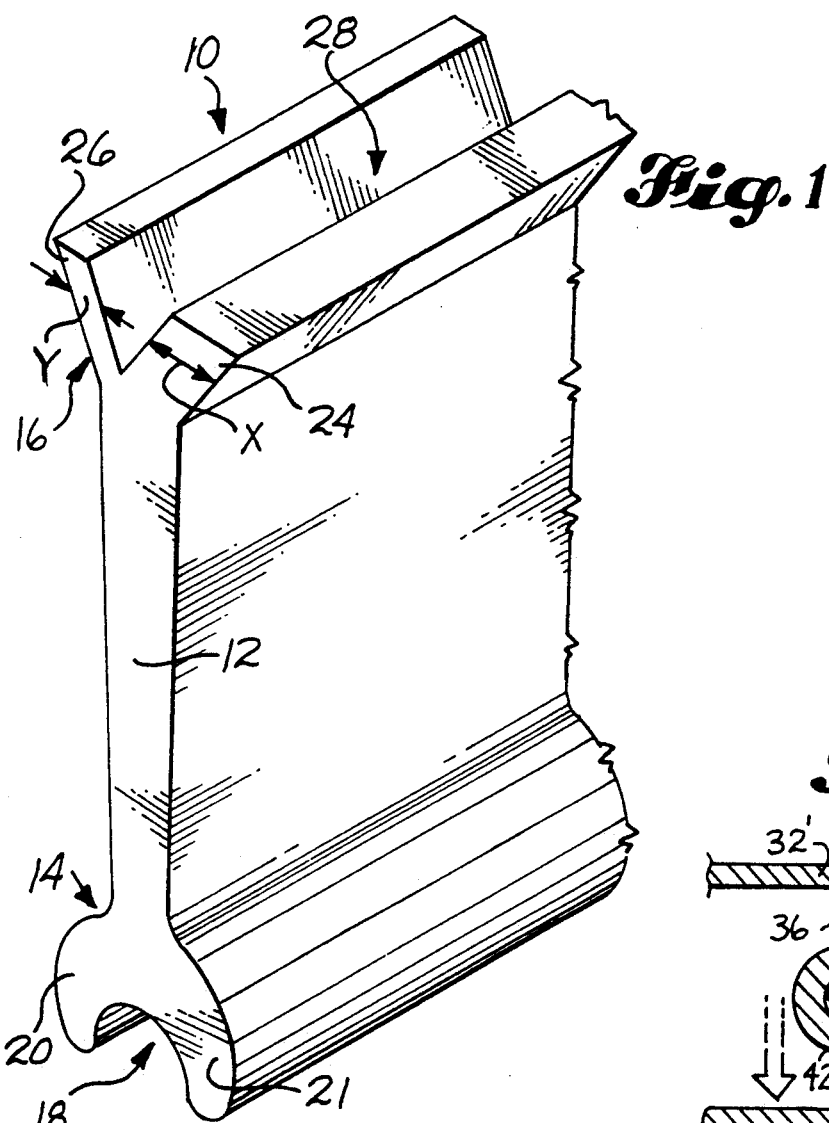
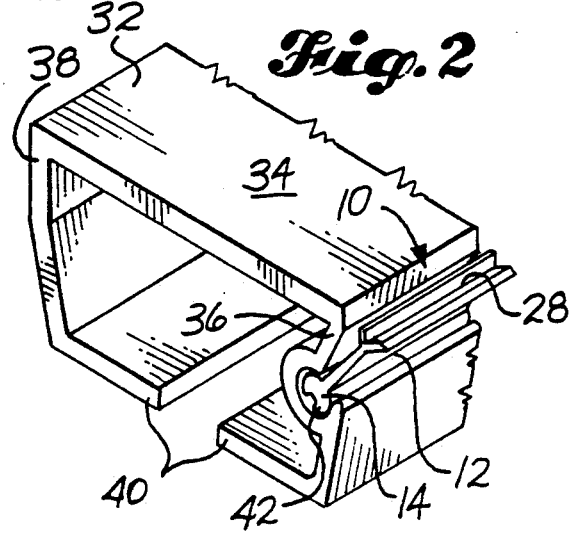
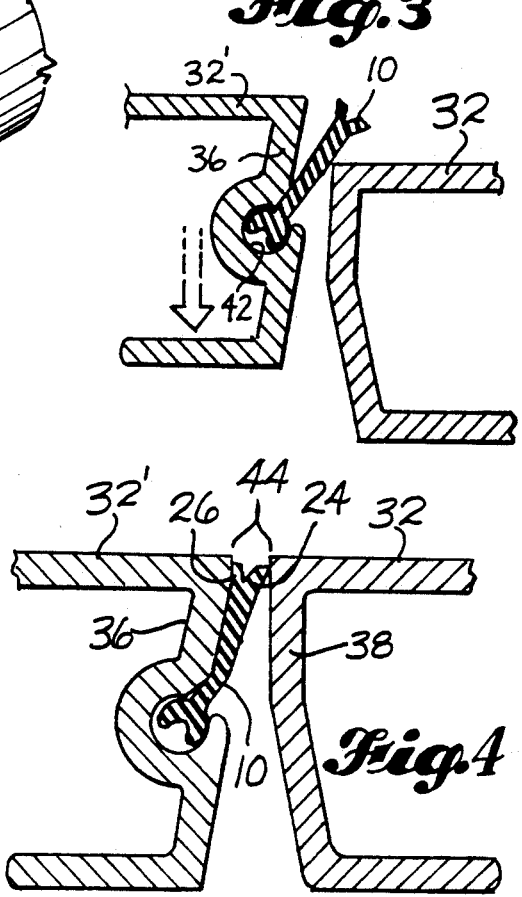

SEAL STRIP FOR RECIPROCATING FLOOR CONVEYORS

TECHNICAL FIELD

This invention relates to reciprocating floor conveyors having elastomeric seals between adjacent floor members of the conveyors. More particularly, it relates to the provision of improved seals for preventing material from passing downwardly between the adjacent floor members.

BACKGROUND ART

Simple seal strips for sealing gaps between adjacent floor members of reciprocating floor conveyors are well known and have been in use for many years. My prior U.S. Pat. No. 4,896,761 discloses a resiliently-bendable elastomeric seal for such a purpose. The elastomeric seal has a base portion received within a groove of a first side edge of each floor member. The elastomeric seal extends upwardly into the gap between each floor member and its adjacent floor member. At its upper free edge, each elastomeric seal is biased against the opposing side edge of the adjacent floor member. The seal strip of the present invention, and its relation to floor slat members of a particular construction, constitute an improvement over the elastomeric seal of my '761 patent, as well as the elastomeric seals of other prior art patents relating to reciprocating floor conveyors.

Adjacent floor members of reciprocating floor conveyors are designed to have a narrow gap therebetween. An elastomeric seal is provided within each of these gaps for sealing the reciprocating floor conveyors. The elastomeric seals prevent debris and other material from falling downwardly between adjacent floor members. In general, the elastomeric seals are secured along one floor member and biased against an adjacent floor member. While such a design functions well in preventing debris from escaping between floor members, it will not necessarily prevent debris from getting captured between the elastomeric seal and its supporting floor member. Captured debris can result in increased wear and abrasion on the seal, therefore effectively shortening the seal's useful life.

A principal object of the present invention is to provide an improved seal strip that seals off the gap between adjacent floor members in the upper regions of the gap and thereby prevents debris or other material from becoming entrapped between the seal and the side edge of a floor member, which debris tends to wear out the elastomeric seal and, thus, requires more frequent replacement.

SUMMARY OF THE INVENTION

The improved elastomeric seal of the present invention includes a split or V-shaped upper edge along the elastomeric seal. The split, V-shaped upper edge includes first and second branches that angle upwardly away from each other, forming the V-shaped configuration of the elastomeric seal. The first and second branches engage the opposed sides of adjacent floor members and are deflected toward each other by the opposed sides. Thus, the resiliency of the elastomeric seal material biases the ends of the branches against the opposed sides of adjacent floor members.

The improved seal strip is provided for use in reciprocating floor conveyors that include side-by-side floor members, each having a top and first and second downwardly-depending opposite sides. The first side of each floor member closely confronts the second side of an adjacent floor member. A relatively small gap exists between the two sides.

The first side of each floor member includes a longitudinal groove for receiving the elongated, elastomeric seal. The elastomeric seal has a base portion that is received within the groove of the first side of the floor members. The elastomeric seal also includes an outboard portion that extends away from the base portion and away from the first side of each floor member upwardly through the gap between adjacent floor members.

The upper free edge of the elastomeric seal includes the V-shaped split. The V-shaped split opens or faces upwardly and is sufficient in expanse to span the gap between adjacent floor members. The gap between adjacent floor members is sufficiently narrow to cause the first and second branches of the upper edge of the seal to be deflected toward each other and biased against the opposed sides of the adjacent floor members.

The V-shaped split of the elongated seal essentially prevents debris or other material from working down between the elongated seal and the first side of the first floor member to which the elongated seal is attached. Such debris, if captured between the seal and a floor member, tends to wear the elongated seal, thus reducing its useful life. With the elongated seal of the present invention, most debris is captured by the branches of the elongated strip and is held above the reciprocating floor conveyor.

In a preferred embodiment, one of the branches of the elongated seal engages the second floor member and is greater in width than the branch of the elongated strip that is biased against the first floor member. The second floor member and the thicker branch of the elongated seal move relative to one another and, thus, are subject to a much greater degree of wear than the first floor member and the branch of the elongated strip in contact therewith. The increased width of the thicker branch thus increases the useful life of the elastomeric seal.

The two branches tend to bias each other against their respective sides of adjacent floor members, which enhances the seal between the elongated seal and the second floor member. This enhanced seal further reduces the amount of debris that is able to escape downwardly between the floor members. In addition, as the elastomeric seal wears, the split branches provide extra bias for the contact between the seal and the second floor member, which improves the seal therebetween.

A rounded groove is formed along the first side of each floor member. The elastomeric seal has a rounded, retaining base portion along the lower edge thereof. The seal extends generally upwardly from the retaining base portion to an upper free edge thereof. The retaining base is received and secured within the rounded groove of the first side of each floor member at such an angle and in such a manner that the seal is bendable upwardly between the floor members from its base portion outwardly from the side of the first floor member to an upright position substantially parallel to the sides of the floor members. The bend in the seal further enhances the biasing force of the elastomeric seal against the second floor member.

Other features and advantages of the present invention can be seen and understood by examination of the appended drawings, description of the best mode for carrying out the invention, and the claims, all of which are incorporated herein by reference as a portion of the disclosure of the present invention.

BRIEF DESCRIPTION OF THE DRAWINGS

Like reference numerals are used to indicate like parts throughout the various figures of the drawing, wherein:

FIG. 1 is a perspective fragmentary view of the elastomeric seal of the present invention;

FIG. 2 is an isometric fragmentary view of the elastomeric seal of FIG. 1 mounted to a floor member of a reciprocating floor conveyor;

FIG. 3 is a fragmentary cross-sectional view of adjacent floor members, one of which is being moved downwardly into place;

FIG. 4 is a fragmentary cross-sectional view of adjacent floor members installed and the elastomeric seal of FIG. 1 biased against the floor members;

BEST MODE FOR CARRYING OUT THE INVENTION

Figure 5:
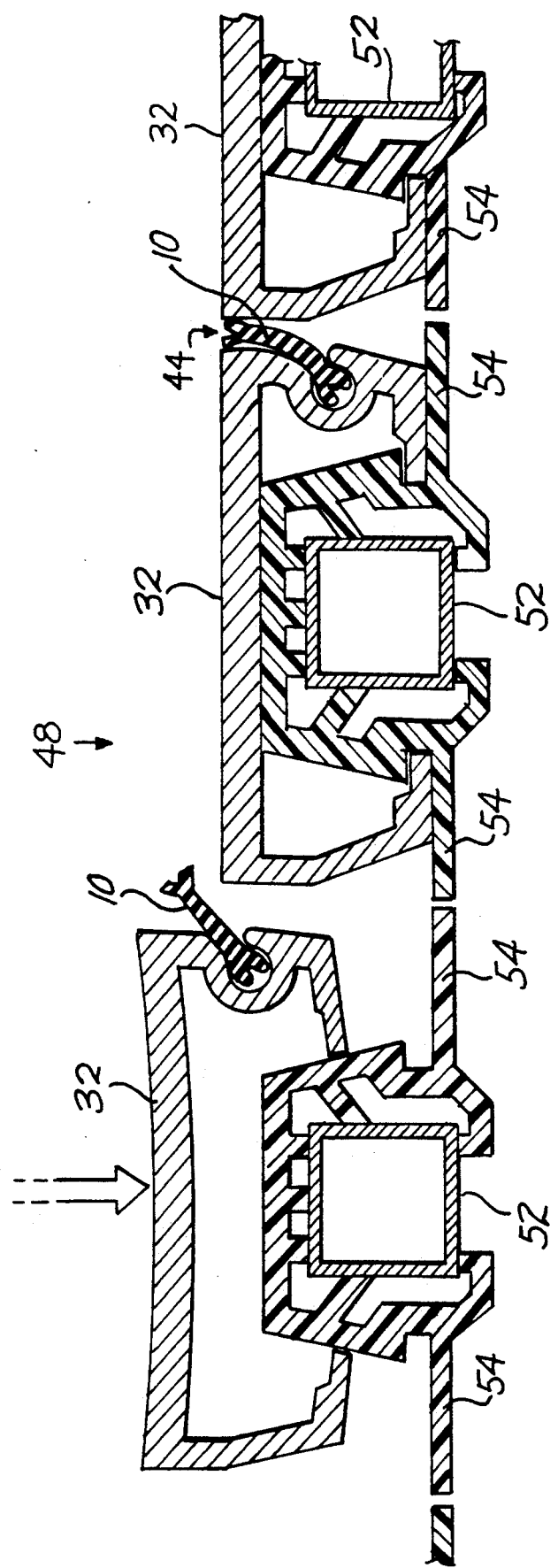
FIG. 5 is a cross-sectional view of a plurality of adjacent floor members installed on bearings of a reciprocating floor conveyor.

My U.S. Pat. No. 4,821,868, issued Apr. 18, 1989, and entitled, "DRIVE/FRAME ASSEMBLY FOR A RECIPROCATING FLOOR CONVEYOR," discloses a presently preferred embodiment of a reciprocating floor conveyor. My U.S. Pat. No. 4,492,303, issued Jan. 8, 1985, and entitled "DRIVE/GUIDE SYSTEM FOR A RECIPROCATING FLOOR CONVEYOR," discloses a preferred support and guide frame construction for floor members. In general, longitudinal floor members are connected to transverse drive beams, which reciprocate back and forth longitudinally beneath the reciprocating floor. The floor members are supported on a series of plastic slide bearings, which in turn are mounted on a series of longitudinal guide beams. The longitudinal guide beams are mounted on a support sub-framework for the reciprocating floor conveyor. The plastic slide bearings snap on to the longitudinal guide beams. My U.S. Pat. No. 4,679,868 issued Jul. 14, 1987, and entitled "BEARING SYSTEM FOR RECIPROCATING FLOOR CONVEYOR," discloses plastic slide bearings that are constructed to be snapped into place on the longitudinal guide beams and which are constructed to allow the floor members to be snapped into place over the plastic slide bearings. The above-discussed patents are expressly incorporated herein by reference.

As discussed in the aforementioned patents, the floor members of a reciprocating floor conveyor are moved in one direction to advance a load along the conveyor. The floor members are then retracted in sets in the opposite direction. The floor members preferably are divided into three sets. All of the floor members are moved in the first direction to advance the load. The floor members are retracted one set at a time until all floor members are at a "start" position. The operation is then repeated to convey a load intermittently along the conveyor. The present invention may also be usable in a reciprocating floor conveyor that operates in a different manner, but wherein generally some floor members move in a forward direction to convey the load and some of the floor members move rearwardly to re-position themselves for a forward conveying movement.

The features and operation of reciprocating floor conveyors are well-known. The present invention provides an improved seal between the floor members for better sealing of the gap between the floor members in order to prevent debris or other material from moving downwardly between the floor members, or getting caught between the seal and a floor member.

In preferred form, the seal strip 10 is extruded by generally well-known methods and is made of a durable, but flexably resilient, material.

Referring now to the Figures, FIG. 1 is a fragmentary perspective view of the elongated elastomeric seal strip 10 of the present invention. The elastomeric seal strip 10 includes a generally flat, slightly tapered central portion 12, a base portion 14, and a split, V-shaped upper edge 16. The central portion 12 of the elastomeric seal strip 10 tapers slightly from the upper edge 16 to the base portion 14.

The base portion 14 is generally rounded with a channel 18 defined therein. The channel 18 creates a pair of rims 20, 21 that are deflectable toward each other.

The split, V-shaped upper edge 16 of the elastomeric seal strip 10 includes a first branch 24 and a second branch 26 extending along the length of the elastomeric seal strip 10. The first and second branches 24, 26 form a V-shaped groove 28 that faces upwardly from the seal strip 10. The width X of the first branch 24 is greater than the width Y of the second branch 26. Preferably, the ratio of the widths is approximately 2 to 1.

FIG. 2 is an isometric view of a portion of the elastomeric seal strip 10 mounted to a portion of a floor member 32 of a reciprocating floor conveyor. The floor member 32 includes a top 34, a first side 36 and a second side 38 depending from the lateral edges of the top 34. Bottom flanges 40 extend inwardly from the lower edges of the sides 36, 38.

The first side 36 includes a rounded dovetail groove 42 extending along its length. The dovetail groove 42 faces outwardly of the first side 36. The base portion 14 of the elastomeric seal strip 10 is secured within the rounded dovetail groove 42. In this manner, the two rims 20, 21 of the base portion 14 are slightly compressed or deflected toward each other. This creates a secure mounting of the seal strip 10 to the side 36 of the floor member. In addition, the deflectable side rims 20, 21 of the base portion 14 allow the elastomeric seal strip 10 to be easily installed into the rounded dovetail groove 42 of the first side 36 of the floor member by sliding the seal longitudinally along the groove.

The outboard portion of the elastomeric seal strip 10 extends from the dovetail groove 42 of the floor member 32 upwardly at an angle away from the first side 36 of the floor member. The V-shaped groove 28 faces generally upwardly from the floor member. As shown in FIG. 2, the central portion 12 of the elastomeric seal 10 is straight and has not yet been bent toward the first side 36 of the floor member 32. Each floor member and elastomeric seal of a reciprocating floor conveyor is constructed in the manner shown in FIG. 2.

As discussed in more detail later, the floor members 32 are installed onto plastic slide bearings of the reciprocating floor conveyor. In FIG. 3, the floor member 32 is shown in an installed position. An adjacent floor member 32' is illustrated being moved downwardly into position adjacent the first floor member 32. Prior to the installation of the adjacent floor member 32', the elastomeric seal strip 10 extends upwardly from the groove 42 along the first side 36 of floor member 32'. The elastomeric seal strip 10 also angles away from the outer wall of the first side 36 of the first floor member 32'.

As shown in FIG. 4, the two adjacent floor members 32, 32' are installed. The proximity of the two adjacent floor members causes the elastomeric seal strip 10 to bend upwardly against the first side 36. The gap 44 between the floor members 32, 32' is slightly narrower than the expanse of the first branch 24 and second branch 26 of the elastomeric seal strip 10. This causes the first and second branches 24, 26 to be slightly compressed toward each other so that they are firmly biased against the second side 38 and first side 36, respectively, of the adjacent floor members.

In this configuration, the expanse of the first and second branches 24, 26 is sufficient to fill the gap 44 between the adjacent floor members. The second branch 26 functions to prevent debris or other material carried on the conveyor from falling between the elastomeric seal strip 10 and the first side 36. Material wedged between the first side 36 and the elastomeric seal strip 10 can cause increased friction therebetween, which tends to wear on the elastomeric seal strip and therefore shorten its useful life.

The second branch 26 also increases the biasing force of the first branch 24 against the second side 38 of an adjacent floor member 32. This provides for a better seal between adjacent floor members. In addition, the increased width of the first branch 24 as compared to the second branch 26 increases the useful life of the elastomeric seal strip. During the course of operation of the reciprocating floor conveyor, the first branch 24 rubs against the second side 38 of an adjacent floor member. The frictional forces between the first branch 24 and the second side 38 of the adjacent floor member are much greater than the frictional forces between the second branch 26 and the first side 36 of the floor member 32' to which the elastomeric seal strip is mounted. Thus, the increased width of the first branch 24 allows for more wear in the elastomeric seal strip and, thus, increases the useful life of the seal strip. In addition, as the first branch 24 of the seal strip wears, the second branch provides extra bias for the first branch against the second side of an adjacent floor member, which also increases the useful life of the seal strip.

FIG. 5 is a cross-sectional view of a plurality of adjacent floor members 32 shown being installed for a reciprocating floor conveyor 48. The reciprocating floor conveyor 48 includes a plurality of longitudinal guide beams 52 that are rigidly secured to the frame (not shown) of the reciprocating floor conveyor. Plastic slide bearings 54 snap fit on the longitudinal guide beams 52 at various points spaced along the guide beams. The floor members 32 in turn snap over the plastic slide bearings 54.

The upward angle of the elastomeric seal strips 10 allow the floor members 32 to be installed onto the plastic slide bearings laterally in consecutive fashion as shown in FIG. 5. After a floor member is installed, the next adjacent floor member to the left is then installed. This causes the elastomeric seal strip 10 to bend upwardly and be pulled downwardly into the gap between adjacent floor members. In this manner, the elastomeric seal strips do not hinder the installation of the floor members.

As shown in FIG. 5, the V-shaped ends of the elastomeric seals span the gaps 44 between adjacent floor members 32. The branches of the V-shaped ends are biased against the sides of the adjacent floor members. Any material carried by the reciprocating floor conveyor is prevented from falling downwardly between the floor members by the elastomeric seals. Moreover, the material is also prevented from becoming caught between the elastomeric seals and the sides of the floor members to which the seals are mounted. Essentially, the material is carried above the floor members at all times.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, patent is to be limited for this invention only by the following claim or claims interpreted according to accepted doctrines of claim interpretation, including the doctrine of equivalence and reversal of parts.

What is claimed is:

1. In a reciprocating floor conveyor including elongated side-by-side floor members, each having a top and first and second downwardly-depending opposite sides, with the first side of a first floor member closely confronting the second side of an adjacent second floor member and forming therewith a gap between the floor members, and an elongated seal within the gap between the floor members, the elongated seal having a base portion connected to the first side of the floor member and an outboard portion extending upwardly in the gap and contacting the second side of an adjacent floor member, the first side of the floor members including a longitudinal groove for receiving the base portion of the elongated seals, each elongated seal comprising:

a split upper edge along the length of the elongated seal including a first branch angled toward the second side of an adjacent floor member and a second branch angled toward and contacting the first side of the floor member to which the seal is mounted, the gap between the adjacent sides of the floor members being sufficiently narrow to cause the first and second branches of the seal to be deflected toward each other so that resiliency of the seal biases the first branch against the second side of the floor member and the second branch against the first side of the floor member to which the seal is mounted.

2. The reciprocating floor conveyor of claim 1, wherein the first branch of the seal has a width greater than the width of the second branch of the seal.

3. The reciprocating floor conveyor of claim 1, wherein the base portion of the seal is secured within the groove of the first side of the floor member in a manner so that the outboard portion of the seal strip extends outwardly of the first side of the floor member a sufficient distance to cause the seal strip to bend about the first side of the floor member with the upper edge of the seal strip in contact with the second side of the adjacent floor member.

4. The reciprocating floor conveyor of claim 1, wherein the groove of the first side of each floor member is substantially circular in cross-section and the base portion of the seal strip includes two curved rims having a channel therebetween and being shaped to conform to the substantially circular dimensions of the groove of the first side of the floor member when the base portion is inserted into the groove.

* * * * *